United States Patent [19]

Geiger et al.

[11] 4,255,363

[45] Mar. 10, 1981

[54] COLUMN SEAL

[75] Inventors: Wilhelm Geiger, Bäumenheim; Adolf Swozil, Kühlenthal, both of Fed. Rep. of Germany

[73] Assignee: Sigri Elektrographit Gesellschaft mit beschränkter Haftung, Meitingen bei Augsburg, Fed. Rep. of Germany

[21] Appl. No.: 106,168

[22] Filed: Dec. 21, 1979

[30] Foreign Application Priority Data

Jan. 9, 1979 [DE] Fed. Rep. of Germany ....... 2900573

[51] Int. Cl.³ .............................................. B01F 3/04
[52] U.S. Cl. ................................. 261/114 TC; 52/246;
202/158; 202/270; 261/94; 261/114 R
[58] Field of Search ............. 52/246; 261/113, 114 R,
261/114 TC, 94–98; 202/158, 269, 270

[56] References Cited

U.S. PATENT DOCUMENTS

| 1,344,608 | 6/1920 | Alston | 52/246 X |
|---|---|---|---|
| 2,263,510 | 11/1941 | Lindsay | 52/246 |
| 2,375,409 | 5/1945 | Glitsch | 261/114 TC X |
| 2,491,726 | 12/1949 | Glitsch | 261/114 TC X |
| 2,710,678 | 6/1955 | Rapisarda | 52/246 |
| 2,931,469 | 4/1960 | Iglehart et al. | 52/246 |
| 3,649,466 | 3/1972 | Boon et al. | 52/246 X |
| 3,928,513 | 12/1975 | Leva | 261/113 |
| 4,055,610 | 10/1977 | Leva et al. | 261/114 R |
| 4,075,298 | 2/1978 | Leva et al. | 261/114 TC |

FOREIGN PATENT DOCUMENTS

| 1946159 | 3/1971 | Fed. Rep. of Germany | 52/246 |
|---|---|---|---|
| 2109889 | 10/1972 | Fed. Rep. of Germany | 261/114 TC |

*Primary Examiner*—Richard L. Chiesa
*Attorney, Agent, or Firm*—Herbert L. Lerner

[57] ABSTRACT

Seal in a column with one or a plurality of trays in which the trays have at their periphery circular recesses in the form of a circular slot. Profiled seals resting against the wall of the column engage in the recesses. The trays have blind holes which at a distance from the periphery of the tray extending down through the circumferential surface through the circular slot. Locking means, preferably wedges, engage in the blind holes to press with adjustable pressure, the profiled seals against the wall of the column.

4 Claims, 1 Drawing Figure

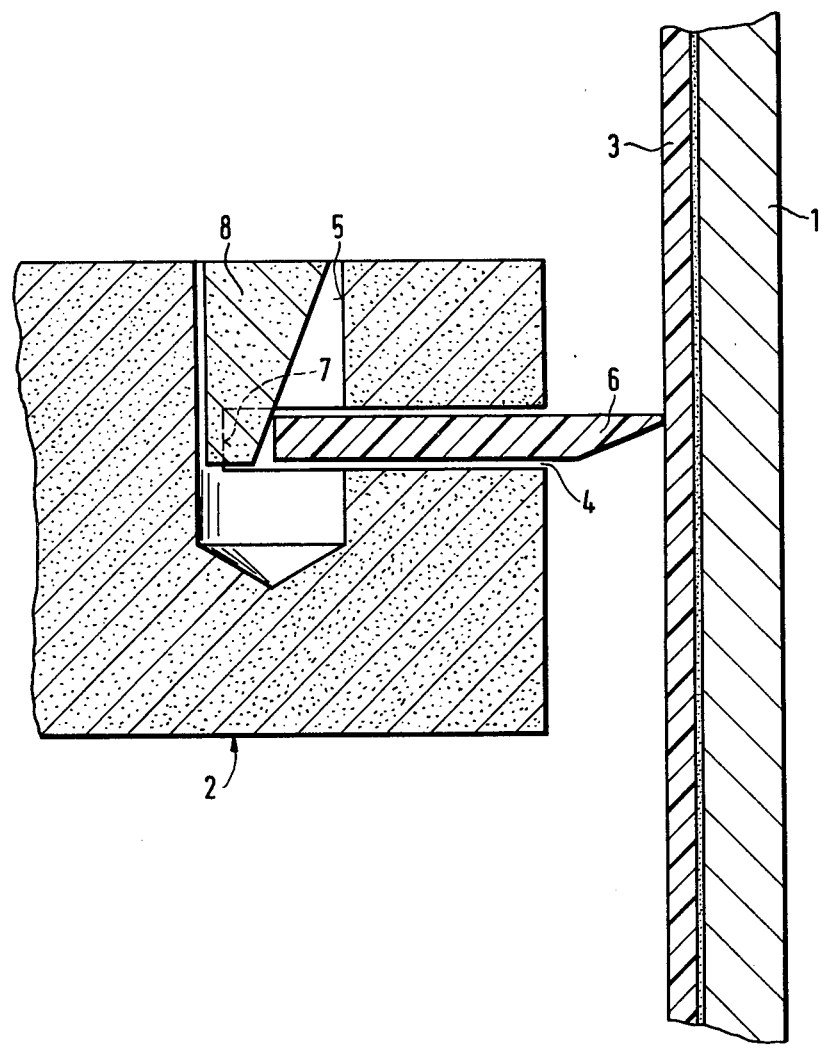

COLUMN SEAL

BACKGROUND OF THE INVENTION

1. Field of the Invention

This invention relates to a column and more particularly to a column with one or several trays, in which there is a seal between the trays and the wall of the column.

2. Description of the Prior Art

Columns with trays are known and commonly in use in industry. Normally there is a space between the periphery of the tray and internal surface of the wall of the tower. It is known to prevent the passage of matter through the separation between a column wall and column internals, especially trays, by means of seals in the manner of a piston ring seal, which while not completely blocking off such space, will at least reduce the passage of matter therethrough. Under normal operating conditions, such seals are satisfactory but are not satisfactory in columns which are exposed to corrosive fluids and are operated at an elevated temperature. The number of usable sealing materials for these extreme conditions is very small, since many sealing materials are operative only at a relatively low temperature and only a small part of the temperature-resistant materials withstand fluids with strongly corrosive action. Materials with good resistance, such as polytetrafluoroethylene (PTFE) or other synthetic fluorine materials and graphite, on the other hand, have substantially less compressibility than sealing materials of the elastomer type and are, therefore, not suitable to compensate for the relatively large installation clearances which may maximially be up to 8 cm and are necessary for columns operated at higher temperatures.

SUMMARY OF THE INVENTION

It is, therefore, and object of the invention to provide a column with trays which have an effective seal for columns having great installation clearances and are subjected to corrosive fluids.

With the foregoing and other objects in view, there is provided in accordance with the invention a column with a cylindrical wall, at least one circular tray disposed in the interior of the column at about a right angle to the wall of the column with the periphery of the tray spaced from the wall of the column, circular recesses in the form of a circular slot at the periphery of the tray, profiled seals engaged in the recesses and extending out of the recesses with the profiled ends of the seals in contact with the wall of the column, blind holes in the tray extending down from a circumferential surface at a distance from the periphery to intersect the circular slot, and locking means in the blind holes engaging the seals to press with adjustable pressure the profiled ends against the wall of the column.

Other features which are considered as characteristic for the invention are set forth in the appended claims.

Although the invention is illustrated and described herein as embodied in a column seal, it is nevertheless not intended to be limited to the details shown, since various modifications may be made therein without departing from the spirit of the invention and within the scope and range of equivalents of the claims.

BRIEF DESCRIPTION OF THE DRAWING

The invention however, together with additional objects and advantages thereof will be best understood from the following description when read in connection with the accompanying drawing showing a partial section of a column with the column shell and tray fixed relative to the shell by means of the seal in accordance with the invention.

DETAILED DESCRIPTION OF THE INVENTION

In accordance with the invention, the trays are provided through their circumferential surface at a distance from the periphery of the tray with blind holes which penetrate the circular slot at least on a part of their depth. Sealing is obtained by pressing the profiled seals with adjustable pressure against the wall of the column by locking means engaging in the blind holes. Blind holes are holes which do not extend all the way through the tray.

Locking means are, in particular, wedges which are superficially roughened or profiled for increasing the friction forces. Other advantageous locking or arresting means are screws or pins of a corrosion-resistant material. Any sealing materials which are stable under the respective operating conditions are basically suited as material for the profiled seal. To increase the specific pressure at the column wall, the seal itself is advantageously feathered in a known manner. Of advantage is the use of a profile seal which is composed of several segments, the segments being made with overlap at the joints in a known manner. A satisfactory seal can be achieved with this design, even if the clearance is not constant over the entire circumferential surface of the colunn. The number of segments accordingly depends substantially on the diameter of the trays and will increase with the diameter.

The invention will be explained by way of example in the following with the aid of the accompanying drawing.

In the drawing, the partial cross section of a column is shown, with the column shell 1 and the tray 2, which latter is fixed relative to the shell. The shell 1 is lined on its inside with a foil 3 of corrosion-resistant polytetrafluoroethylene. Starting from its cylindrical surface, the tray 2 of corrosion-resistant graphite has a circular slot 4 and blind holes 5, which go with at least part of their length through the circular slot 4, starting from the top surface of the tray. Into the circular slot 4, a profiled seal 6 is inserted composed of segments and consisting of PTFE. In installing the tray in the column, the profiled seal 6 is pushed all the way to a stop at the surface 7 of the circular slot 4. The tray is then inserted into the column and is fastened. Wedges 8 are pressed into the blind holes 5 and the individual segments of the profiled seal 6 are displaced until they come to a stop against the column shell or the column lining 3. By pushing in the wedges further, an advantageous pretension, perhaps determined by simple trial, can then be adjusted, or the feathered part of the profiled seal can be bent over against the column lining. Uniform pressure of a profiled seal of PTFE is in general ensured if the number of blind holes per segment is about 3 to 4.

There are claimed:

1. A column with a cylindrical wall, at least one circular tray disposed in the interior of the column at about a right angle to the wall of the column with the periphery of the tray spaced from the wall of the column, circular recesses in the form of a circular slot at the periphery of the tray, profiled seals engaged in the recesses and extending out of the recesses with the profiled ends of the seals in contact with the wall of the column, blind holes in the tray extending down from a circumferential surface at a distance from the periphery to intersect the circular slot, and locking means in the blind holes engaging the seals to press with adjustable pressure the profiled ends against the wall of the column.

2. Seal according to claims 1, wherein the locking means are wedges.

3. Seal according to claims 1 and 2, wherein the profiled seal is composed of several segments.

4. Seal according to claims 1 and 2, wherein the profiled seal is composed of several segments, and wherein the number of blind holes per segment is about 3–4.

* * * * *